(12) United States Patent
Lee (10) Patent No.: US 7,483,673 B2
(45) Date of Patent: *Jan. 27, 2009

(54) POWER LINE COMMUNICATIONS USING BATTERY DEVICES

(75) Inventor: Sung Sub Lee, Anyang (KR)

(73) Assignee: Seoby Electronics Co., Ltd., Anyang, Kyunggi-do (KR)

( * ) Notice: Subject to any disclaimer, the term of this patent is extended or adjusted under 35 U.S.C. 154(b) by 317 days.

This patent is subject to a terminal disclaimer.

(21) Appl. No.: 10/752,264

(22) Filed: Jan. 6, 2004

(65) Prior Publication Data

US 2005/0113054 A1    May 26, 2005

(30) Foreign Application Priority Data

Nov. 24, 2003    (KR) ...................... 10-2003-0083545

(51) Int. Cl.
    *H04B 5/00*    (2006.01)
(52) U.S. Cl. ..................................... 455/41.2; 455/352
(58) Field of Classification Search ......... 455/418–420, 455/41.1, 41.2, 41.3, 68, 557, 572–573, 575.7, 455/129, 269, 270, 352–355; 340/310.01
    See application file for complete search history.

(56) References Cited

U.S. PATENT DOCUMENTS

| | | | |
|---|---|---|---|
| 4,532,194 A | 7/1985 | Liautaud et al. | |
| D310,367 S | 9/1990 | Dockery | |
| 5,142,395 A | 8/1992 | Yamazaki et al. | |
| 5,142,396 A | 8/1992 | Divjak et al. | |
| 5,142,398 A | 8/1992 | Heep | |
| 5,142,399 A | 8/1992 | Bertrand et al. | |
| 5,142,400 A | 8/1992 | Solinsky | |
| 5,268,734 A | 12/1993 | Parker et al. | |
| 5,677,895 A | 10/1997 | Mankovitz | |
| 5,710,458 A * | 1/1998 | Iwasaki | 257/679 |
| 5,917,425 A | 6/1999 | Crimmins et al. | |
| 5,999,294 A | 12/1999 | Petsko | |
| 6,175,308 B1 | 1/2001 | Tallman et al. | |
| 6,400,480 B1 | 6/2002 | Thomas | |
| 6,915,109 B2 * | 7/2005 | Wouters et al. | 455/45 |
| 7,062,175 B2 * | 6/2006 | Stevenson et al. | 398/115 |
| 7,181,164 B2 * | 2/2007 | Lee et al. | 455/41.2 |
| 2005/0088281 A1 * | 4/2005 | Rohrberg et al. | 340/5.71 |
| 2006/0089177 A1 * | 4/2006 | Lee et al. | 455/572 |

FOREIGN PATENT DOCUMENTS

JP    02005323249 A  * 11/2005

* cited by examiner

*Primary Examiner*—Nguyen Vo
(74) *Attorney, Agent, or Firm*—Kramer Levin Naftalis & Frankel LLP; Gregor N. Neff, Esq.

(57) ABSTRACT

The operational range of a wireless controller is extended by use of RF communications instead of or in addition to other signaling radiation such as infrared. Advantageously, power line communications technology is used to extract an RF signal from the power line of the device. The power line also is used as an antenna for a transceiver so as to minimize the size of the transceiver and to provide an improved antenna.

21 Claims, 4 Drawing Sheets

POWER LINE COMMUNICATIONS USING BATTERY DEVICES

The present invention relates to wireless remote control devices, such as those used to remotely control TV receivers, VCRs, DVD or other record players, etc. In particular, the invention relates to such remote controllers which use radiation other than RF to communicate with the controlled device, and to RF devices for extending the range of such remote control devices.

Remote control devices for television receivers, etc., have been used for many years. Typically, they use infrared radiation, ultrasonic waves, etc. to transmit commands to and from the controlled device. However, the operational range of such devices is not very great. Moreover, direct line of sight communication often is required between the remote control device and the controlled device.

Solutions have been proposed for alleviating these problems by providing conversion of the radiated signals into RF signals, broadcasting them, and using the broadcast signals to create corresponding radiation signals which then are used to control the television receiver or other controlled device. This has the effect of extending the range of the handheld remote unit.

Some devices have provided RF transceiver units which can fit into the battery compartment of the usual handheld device. However, there are significant problems with such devices.

First, such devices are relatively expensive to make.

Secondly, when the transceiver is physically located within the device, such as in the battery compartment, often the structure of the remote control device interferes with transmission and reception of radio signals by the transceiver because metal parts or labels, etc., interfere with the RF transmission and/or reception. Moreover, the antenna used by the transceiver is small. As a result, radio communications are not as reliable and strong as they might be.

Accordingly, it is an object of the present invention to overcome the problems outlined above.

In particular, it is an object to provide a wireless controller with radio frequency control communications which are relatively low in cost and yet provide relatively interference-free radio transmission with good strength and range.

In accordance with the present invention, the foregoing objectives are met by the provision of a radio frequency extender for wireless controllers which utilizes power line communications ("PLC") technology. Specifically, the power line of the remote control device is used as an antenna in the transmission of and reception of RF signals. This eliminates the need for a separate antenna in the RF transceiver, thus making it possible to reduce the size and cost of the device.

The power line also is used advantageously as a source of RF and communications data which is supplied to a transceiver for transmission of RF control signals to remotely controlled equipment.

Specifically, a transceiver is provided to detect communications data from the power line of the wireless control device, convert the communication data into an RF format signal, transmit the RF format signal through the power line used as an antenna, and receive an RF return signal through the power line, again used as an antenna, and reconvert that signal into communication data to complete a data communication.

In addition, the antenna so provided is relatively large and is very unlikely to be blocked or impeded in its operation by metallic labels, plates, etc., which can interfere with radio transmission.

Furthermore, the transceiver can be housed in a metal or other conductive housing without interfering with the operation of an antenna which otherwise would have to be located in the housing. This makes the housing stronger and more durable.

Preferably, the transceiver is housed in a housing which is shaped like an ordinary battery, and is fitted into the battery compartment so as to replace an ordinary battery. The battery in the transceiver housing supplements the primary battery if the device uses more than one battery.

The battery in the transceiver housing can be either rechargeable or one which easily can be replaced, in which case it is a single-use battery.

Preferably, the device of the invention includes a manually operated on/off switch which can be used to enable or disable the transceiver. This allows the user to choose between the normal mode of operation using non-RF signaling, and the system with the RF extender.

Preferably, means are provided to supply a unique identification code to distinguish signals which might be received from other remote sources so as to avoid unwanted operation. Advantageously, the code can be set by operation of the manual on/off switch.

It also is preferable that the device has a display to indicate the discharge state of the battery housed with the transceiver, and a battery recharge circuit for use in recharging a rechargeable battery.

A signaling device using a piezoelectric crystal circuit is provided, optionally, as a sounding device to help in locating a lost remote control unit, and for use with the charge level display for the battery.

The foregoing and other objects and advantages of the invention and set forth in or apparent from the following description and drawings.

GENERAL DESCRIPTION

Figure 1:
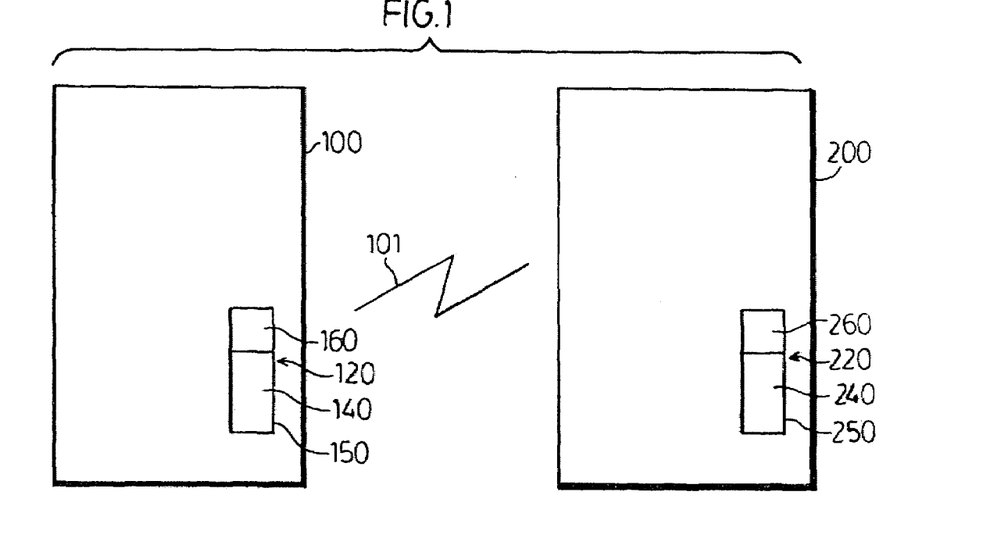
FIG. 1 is a schematic diagram of remote communications devices of the invention used to remotely control a device such as a TV receiver, VCR, etc.

FIG. 1 shows a wireless data communication device 100 which is remote from a remotely controlled device 200 which is in or attached to a controlled device (not shown) such as a television receiver, VCR, computer, DVD or CD player, MP3 device, or any other appliance or device to be controlled remotely by wireless.

The remote control device 100 contains a RF control unit 120 constructed in accordance with the present invention. Similarly, the companion device 200 has an RF control unit 220 for communication with the remote RF control unit 120 and is adapted to use the control signals it receives to control the operation of the controlled device.

RF transmission between the devices 120 and 220 is indicated by the jagged line 101 in FIG. 1.

Each of the RF control devices 120 and 220 includes an RF transceiver 160 or 260 in a housing 150 or 250. Also, preferably, each housing 150 or 250 contains a battery 140 or 240 to supply power for the communications operations of the transceiver and of associated circuitry, either alone or in association with standard batteries provided in the equipment 100 and 200, as it will be explained below.

Although the RF control devices 120 and 220 are shown as separate units with their own housing, it should be understood that the devices can be built into the units 100 and 200.

Also, the units 200 and/or 100 each can be operated from electric power supplies other than batteries, such as solar cells, standard electrical power outlets in buildings (with rectifiers), stand-alone electric power generators, etc., if it is convenient and advantageous to do so.

However, in its best mode, the RF control device is embodied in a housing which is shaped like an ordinary battery such as is used in typical remote control units so that it can be used to replace one of the batteries to convert at least the remote unit 100 into an RF control device without having to change the basic construction of the device and, preferably, without changing its ability for wireless operation by other means such as infrared emission and detection, ultrasonic emission and detection, etc.

In the specific case in which the wireless data communication device 100 uses an infrared emitter, and the controlled device has an infrared receiver, the device 100 still will operate to use infrared communication, but can use RF communication to extend the operational range of the device 100.

In general, the system of FIG. 1 operates by using power line communication ("PLC") techniques. The transceiver 160 in the RF control unit 120 is connected to the power line of the device 100 to detect the communication data in signals flowing there, converts that information into RF format signals, and transmits them to the companion unit 200, using the power line as an antenna.

The transceiver 260 in the unit 200 detects the RF signal, reconverts it into the original communication data and sends it to the control device 200. If the controlled device (TV receiver, etc.) requires infrared signals, the unit 200 converts the communication data into infrared signals and delivers them to the controlled device.

The invention is based, in part, upon the recognition that the power line in the device 100 or 200 carries an RF signal representative of the communication data mixed in the power line with the DC power signal just like other noise, and converts that signal into a RF format signal. The device 100 or 200 is a modem which can communicate with other devices without a communication line; that is, it is wireless. It converts the communication data into high frequency signals with frequencies in the KHz or MHz ranges, and sends the signals through the power line with the power. The device of the invention then extracts the communications signal using a high frequency filter. The power line communications modem can be used to communicate with a LAN, and can be used for remote control automation in the home or factory.

The invention also includes realization that the same power line which serves as the source for RF carrier signals and data communication signals also can be used as an antenna for the transceiver, both for transmission of RF and for receiving RF from the other wireless control device 200.

The invention thus makes it unnecessary to supply a separate antenna for the transceiver 160 and can be a much better antenna because of its broad expanse and ability to avoid deterioration of transmission and reception due to metallic labels or other interfering objects in the communication devices.

Power Line Communications

Figure 2:
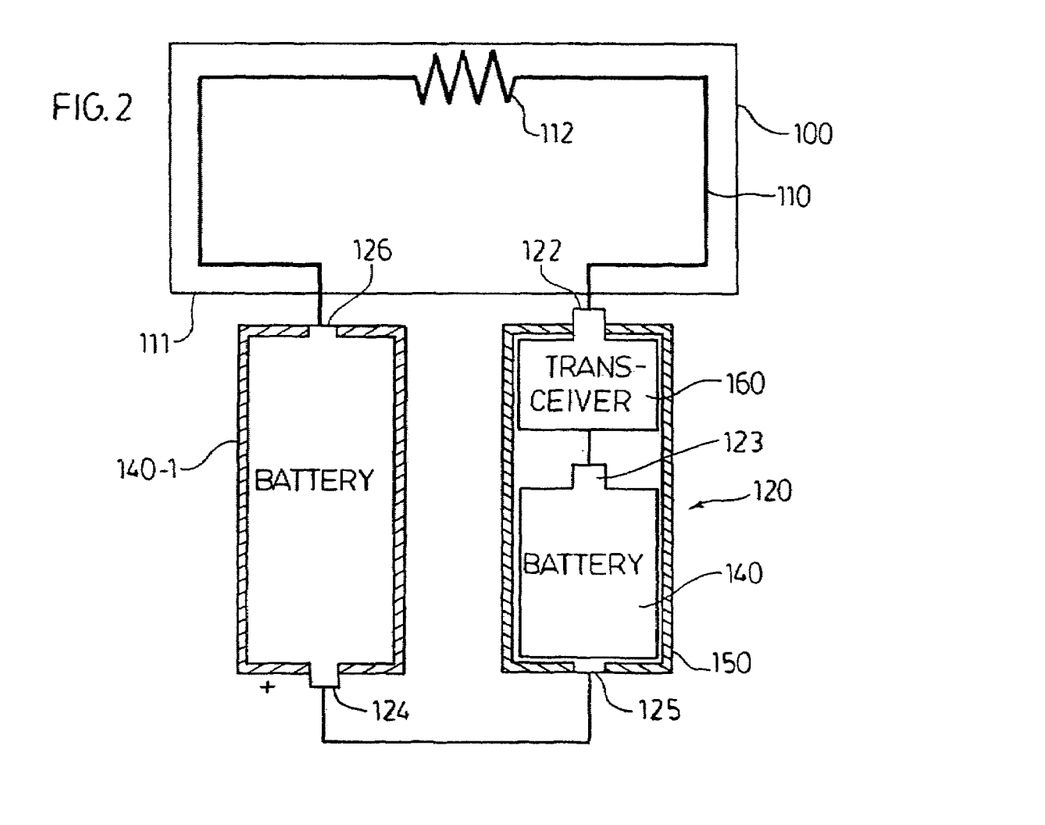
FIG. 2 is a schematic circuit diagram of a portion of a remote controller of FIG. 1.

FIG. 2 is a schematic diagram showing the RF control unit 120 connected into the electrical circuit of the wireless device 100 printed circuit board 111. In addition to the battery 100 and the transceiver 160 in the housing 150, a standard battery 140-1 which normally is provided with the unit 100 also is shown.

The power line 110 is used to conduct DC power to the circuitry on the PC board 111, which is schematically represented by the resistor 112.

Advantageously, the transceiver 160 and battery 140 are mounted in a housing 150 which can be made of metal and can have the same shape and operative configuration as an ordinary battery so that it can simply be fitted into the battery compartment of the device 100 or 200 in place of an ordinary battery. This avoids modifying the internal construction of the device 100 or 200 and makes it easy to convert existing wireless control devices to both RF and other wireless operation.

Figure 8:
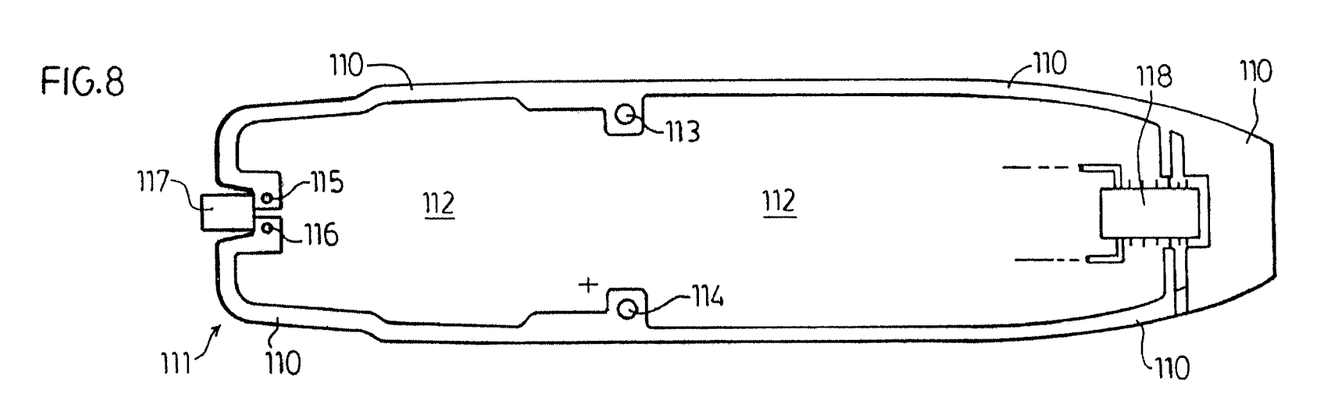
FIG. 8 is a top plan view of a portion of the printed circuit board for a typical communications device of the invention.

FIG. 8 is a top plan view, partially schematic, showing a typical printed circuit board 111 and the power line 110 as it actually appears in a typical hand-held remote control unit 100. The details of the circuitry 112 on the printed circuit board ill are omitted for the sake of simplicity in the drawings.

Figure 9:
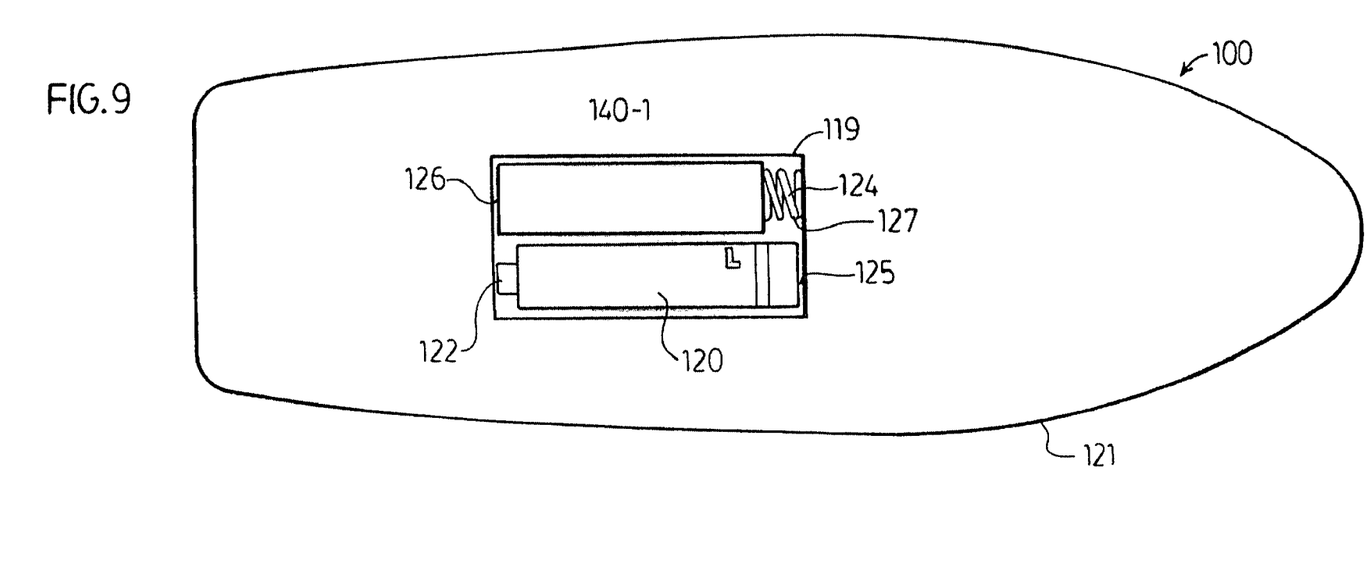
FIG. 9 is a plan view of the rear outside of the housing of the unit in which the printed circuit board of FIG. 8 is contained, with the battery compartment open.

FIG. 9 is a plan view of the rear or bottom surface of the housing 121 of the device 100, showing a battery compartment 119 (without its cover) containing the battery 140-1 and the RF control unit 120.

It can be seen in FIG. 8 that the power line 110 circles essentially entirely around the periphery of the printed circuit board. It is connected to a microprocessor 118 which is used as the control element in the circuit on the printed circuit board, and to an infrared emitter 117 which is connected at points 115 and 116 to the power line 110.

Two relatively large electrical contacts 113 and 114 make contact with opposite sides of the power line 110. When the printed circuit board 111 is mounted in the housing 121, electrical contact is made between the positive terminal 122 of the RF control unit 120 and the contact 113 of the power line 110. Also, contact between the negative terminal 126 of battery 140-1 and the terminal 114 on the printed circuit board 111 are made. The positive terminal 124 of battery 140-1 is connected to the negative terminal 125 of the unit 120 (Fee FIG. 2) and a spring 127 (FIG. 9) aids in making electrical contact and holding the battery 140-1 in place. Thus, the combination of batteries and transceiver are connected electrically between the contacts 113 and 114 of the power line 110.

The power line 110 has a relatively very large surface area and broad expanse; it extends around the periphery of the printed circuit board, where it avoids interference from metallic labels or other metallic obstructions which might interfere with the RF transmission to and from the power line 110 when used as an antenna.

As mentioned above, the invention makes use of the recognition by the inventor that the power line 110 carries RF signals of a frequency in the 30 to 50 KHz range along with direct current and noise.

Thus, the transceiver of the invention utilizes the power line both as a source of RF signals representative of the communication data, such as that created when someone operates the pushbuttons on the other side of the housing 121 (not shown) to change channels, adjust volume, or operate other controls to control the equipment which is under remote control.

Thus, the invention uses the principles of power line communications ("PLC") to simultaneously conduct power (in this case, DC power) to the circuit devices while conducting RF frequency signals for communication purposes.

Figures 3, 4, 7:
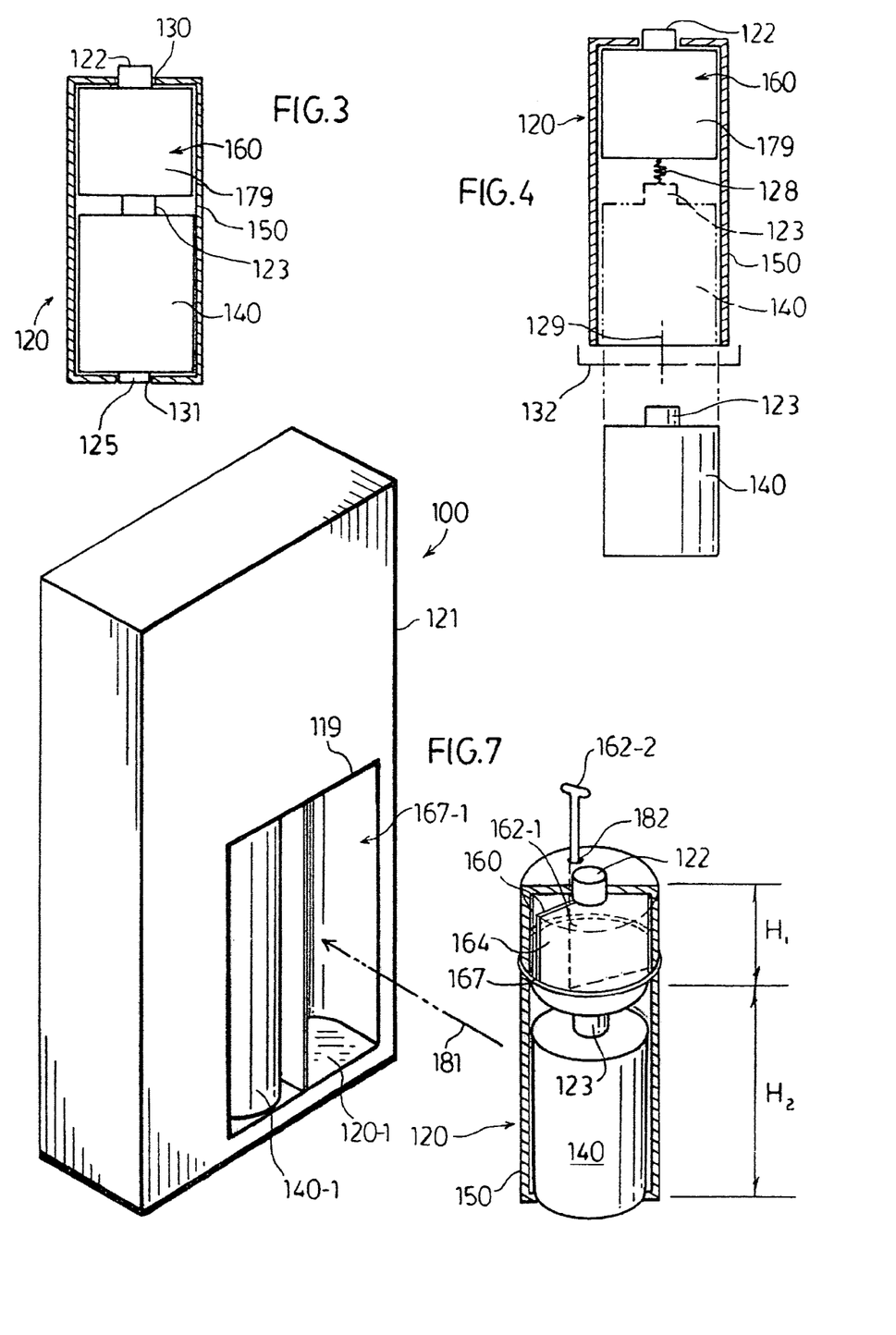
FIG. 3 is a schematic and cross-sectional diagram of the transceiver-battery unit of the device shown in FIG. 2.
FIG. 4 is a schematic and cross-sectional diagram of an alternative construction for the unit shown in FIG. 3.
FIG. 7 is a partially schematic exploded perspective view of the communications device of the present invention.

FIG. 3 shows the construction of the RF control unit 120 in the embodiment in which the battery 140 is rechargeable.

The transceiver has a positive terminal 122 which extends through an insulated opening 130 in the top of the metal housing 150. A metal can 179 encloses the transceiver device.

The battery 140 has a positive terminal 123 which makes contact with the negative terminal of the transceiver 160. The battery 140 has a negative terminal 125 which is exposed at an insulated opening 131 in the bottom of the housing 150. The battery 140 and the transceiver 160 are in permanent contact with one another.

The rechargeable battery shown in FIG. 3 can be recharged with the usual home battery recharger.

FIG. 4 shows the construction of the RF control unit 120 when the battery 140 is a single-use, non-rechargeable dry cell. The bottom of the housing 150 is open and is closed with a removable screw cap 132 shown in dotted lines in FIG. 4. A spring, shown schematically at 128, makes electrical contact between the positive terminal 123 of the battery 140 and the negative terminal of the transceiver 160 when both the battery and the transceiver are in the housing 150, and urges the transceiver and battery towards opposite ends of the housing 150.

When the battery 140 is exhausted, the screw cap 132 can be removed and the battery will be forced out of the housing by the spring 128 and can be removed in the direction indicated by the arrow 129. Then, a fresh battery can be inserted into the housing and the screw cap 132 closed.

The size of the housing 150 is essentially the same as that of a normal alkaline battery such as an AA size or a AAA size. However, the size of the housing can be varied to fit into any battery compartment or other convenient receptacle. Thus, the housing can be a telescoping two-part housing which is adjustable in length, or other convenient shape.

Advantageously, the housing can be made of metal because there is no antenna in the housing due to the fact that the power line 110 is used as the antenna. Also, since there is no antenna in the housing, there is more room for other components.

Of course, it is within the scope of the invention to locate the battery 140 and the transceiver in separate housings, if this is advantageous in a particular utilization.

Transceiver

Figure 5:
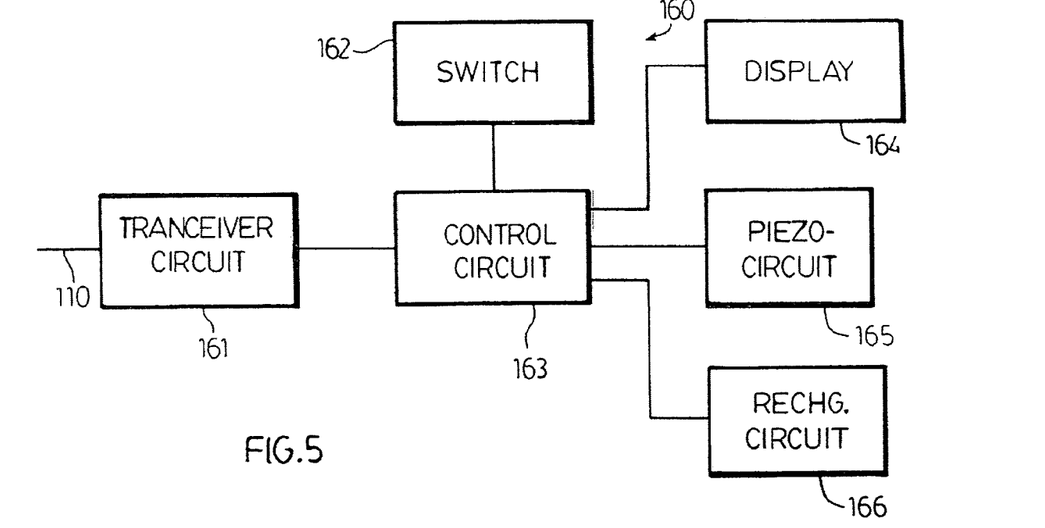
FIG. 5 is a schematic circuit diagram of an example of a transceiver usable in the invention.

FIG. 5 is a schematic circuit diagram of the transceiver 160. The transceiver 160 includes a transceiver circuit 161 connected to the power line 110 for use both as a signal source and an antenna, as described above and hereinbelow.

The transceiver circuit delivers its output to a control circuit 163, which is a microprocessor or other, preferably programmable, control circuit device.

A manually operable switch 162 is connected to the control circuit to enable and disable the transceiver 160, and also to insert a unique identification code signal which is used to prevent the unwanted functioning of the transceiver in response to signals received from a source other than a mating transceiver such as the transceiver 260 shown in FIG. 1.

The control circuit 163 signals a conventional display circuit 164, and a conventional piezoelectric circuit 165 to develop an audible and/or visible signal to indicate whether the RF signal has been transmitted completely.

The control circuit 163 also operates a conventional recharge control circuit 166 to control the recharge of a rechargeable battery such as that shown in FIG. 3.

Figure 6:
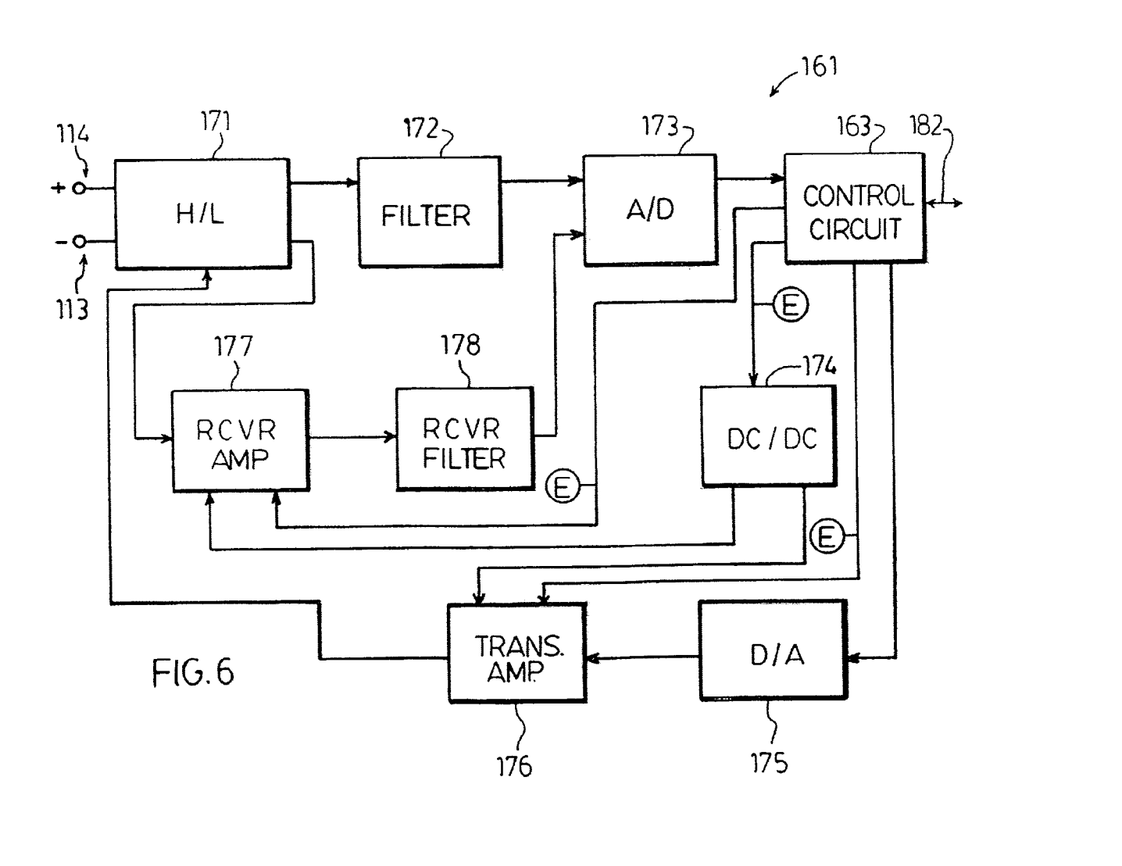
FIG. 6 is a schematic circuit diagram of the RF transceiver circuit of the transceiver shown in FIG. 5.

FIG. 6 is a detailed schematic diagram of the transceiver circuit 161.

The transceiver circuit 161 includes a high/low-frequency signal blocking circuit 171 connected to the power line 110 via terminals 113 and 114. The circuit 171 includes a DC blocking capacitor and an inductance coil providing a high impedance to very high frequency signals to effectively block them.

The circuit 171 should be designed to achieve impedance matching for the power line 110 of the device 100. Also, it should prevent electromagnetic interference between the device 100 and the RF unit 120.

One output line from the circuit 171 goes to a filter 172 which acts together with circuit 171 to serve as a detector for the carrier and communication signals extracted from the power line 110. The filter 172 has a pass band to pass signals in the range of frequencies of the carrier and thus separates the carrier from any noise which might be present in the line.

The signal from filter 172 then is sent to an analog to digital converter 173 where the communication data and carrier wave are converted into digital form and sent to the control circuit 163.

The control circuit 163 is programmed to convert the information it receives into RF format by means of a look-up table.

The control circuit 163 uses the incoming communication data signal as an enable signal and produces a corresponding enable output signal on three output lines marked with the letter "E".

One of the output lines carrying an enable signal leads to a DC/DC converter (amplifier) 174 which amplifies the voltage it receives and delivers it to a transmitting amplifier 176, and a receiver amplifier 177.

A second output line sends an enable signal to the transmitting amplifier 176, and a third line sends an enable signal directly to the receiver amplifier 177.

The RF format signal is delivered from the control circuit 163 to a digital to analog converter 175 which converts the digital information into analog form suitable for wireless transmission, sends that signal to the transmitter amplifier 176, which sends an output signal through the circuit 171 to the antenna 110 where it is broadcast and picked up by the antenna of the device 220 (FIG. 1) and used to send control signals to the device being controlled.

The identification signal is added to the RF control data by the switch 162.

When operating in the receiving mode, the antenna 110 receives signals broadcast by devices such as the unit 220, and the incoming signal is transmitted through the blocking circuit 171 to a receiving amplifier 177.

When the control circuit 163 receives an enable signal from the A/D converter 173, it sends enable signals to the receiver amplifier and a signal is sent corresponding to the communications data through the receiver filter 178 which is tuned to the incoming RF, into the analog to digital converter 173 to the control circuit which then sends the communication data by way of a line 182 to circuits 164-166, and to the control circuit of the communications device 100.

FIG. 7 shows the embodiment of the invention in which the RF control device 120 is shaped like a battery to fit into one slot 120-1 of the battery compartment 119 of the device 100. The device 120 is shown partly in cross-section and is shown removed from the battery compartment and can be returned to the compartment by pushing it in the direction of the arrow 181.

The switch 162 consists of an inner portion 162-1 connected to a slide member 162-2 which is inserted through a hole 182 in the housing 150 and can be operated manually to switch the control unit 100 between operation either by RF communication or by the use of other radiation, or by both.

Preferably, the switch 162 is a slide switch or a dip switch, which is shown in its extended position. It can be pushed back into the housing to enable the unit 120 to fit into the housing 150. It is programmable by the user, if desired, to set a unique signal which is used to prevent the device from malfunctioning in response to signals from other transceivers not intended to operate with the control unit 100.

An optional feature shown in FIG. 7 is the provision of a electrical contact ring or belt 167 which extends around the outer surface of the housing 150, and is suitably insulated from the metal housing. The battery compartment 120-1 is supplied with a contact 167-1 positioned to make contact with the ring 167 when the device 120 is inserted into the compartment 120-1. Terminal 167-1 is connected to the interrupt terminal of the control circuit in the wireless data communication device 100.

When the device 100 transmits any communication data, an interrupt signal is sent through the contact 167-1 and the contact ring 167 to send an enable signal to the control circuit 163. In this embodiment of the invention, communication data input or output is directly through the contact ring 167.

The switch also has a fuse which prevents the short circuiting of the unit 120 and protects the battery 140.

The display 164 is visible on the outer surface of the RF control device 120 through a window. This informs the user of the battery's charge state, and provides an alert when the battery 140 is almost discharged.

The piezoelectric circuit 165 operates a speaker (not shown) in the unit 100 which emits audible sounds indicating that the battery is recharged completely, and emits a tone whenever a wireless device 100's key is pressed, and audibly informs the user that the battery charge is low.

The control circuit 163 controls the piezoelectric circuit 165 to emit a sound or a light signal to inform the user of its location when the device 100 is lost.

The transceiver desirably should be as small as possible. Thus, it should be implemented by integrated circuits, ASIC, COB (Chip On Board), or hybrid integrated circuit technology.

As it is shown in FIG. 7, the height H1 of the transceiver section is roughly one-third of the total height of the unit 120, and the battery section height H2 is about two-thirds of the total height.

Operation

Assume that the wireless device 100 is a remote controller using infrared radiation to control a operated device such as a television receiver, VCR, PC, printer, MP3 device, DVD device, etc.

First, the device 120 is inserted into the receptacle 120-1 (FIG. 7) of the battery box 119 on the unit 100.

When the user presses any key or button on the remote unit 100 to perform any control, the detector, consisting of the blocking circuit 171 and filter 172, extracts a carrier signal from the power line 110 which is then sent to the control circuit 163 as an enable signal.

Alternatively, if the unit 100 has an interrupt contact 167-1 and the unit 120 has a contact ring 167, the enable signal can be delivered to the control circuit 163 through the contact ring 167. The interrupt signal is supplied by the control circuit of the device 100 in the normal operation of the device.

After the control circuit receives an enable signal sent either through the power line 110 or contact ring 167, it is enabled to transmit an RF signal.

The RF transceiver circuit 161 in the transceiver 160 transmits and receives RF signals pursuant to instructions given by the control circuit 163.

In the case of an infrared communication system device, a thirty to fifty KHz carrier signal is received from the power line 110.

Then, the A/D converter 173 converts the carrier signal into digital communication data corresponding to the data contained in the signal detected and transmits it to the control circuit 163.

The control circuit 163 converts the communication data into RF control data according to a transform table stored in the unit 163 to define the relationship between the communication data and RF control data. The RF control data then is sent to the D/A converter 175.

At this time, the control circuit 163 adds the identification signal from the switch 162 to the RF control data to uniquely identify the signal to distinguish it from other devices which also may be transmitting and receiving RF signals within the vicinity of the units 100 and 200.

If the contact ring 167 is used, the control circuit receives communication data directly through the ring 167 and then transmits the control data corresponding to the communication data to the D/A converter 175.

The DC/DC converter 174 is operated by the enable signal, as described above, and amplifies the voltage of the battery 140. For example, it amplifies the voltage from 1.2 volts to 5 volts. This sets the amplifying levels of the transmitting and receiving amplifiers, and increases the transmission power and thus extends the operational range of the devices 120 and 100. The DC/DC converter 174 needs no current in its waiting mode so that the stand-by current drawn from the battery 140 is zero.

Signal transmission and reception through the antenna 110 proceeds as already described above.

As discussed above, the ID signal is a part of the signal delivered to the control circuit 163 with any signals received. If the control circuit determines the ID signal is incorrect, the control circuit does nothing further.

If the ID signal is right, as discussed above, the communication data received is used to perform any function needed. The communication data can be sent through the line 182 directly to the control circuit of the device 100, if the contact ring 167 and interrupt contact 167-1 are available.

As it can be seen from the foregoing, the invention admirably achieves the objectives stated above.

The RF signal corresponding to the communication data is extracted from the circuit of the control unit 100 simply and efficiently by conducting it from the power line of the device to the transceiver. This use of power line communication technology assures conductive communication of signals with minimum interference.

The power line also is used for a second purpose—namely, as an antenna for the transceiver to both transmit and receive RF signals.

The power line of the unit makes a superior antenna because it is much larger than an antenna which otherwise would have to be fitted into the small metal housing of the transceiver, and is located where it is very unlikely to experience any interference in reception or transmission due to metal labels or other structure of the device 100.

The provision of a unique ID signal for each unit minimizes the chances of malfunction due to the reception of signals not intended for the unit. The provision of an on/off switch, especially one in which the identification code can be changed, enables the unit to be turned off. Furthermore, power is saved because the RF communication control unit is operated only when the device receives an enable signal. The display of the battery recharge state is a convenience to the user.

The device allows an existing wireless control device to be converted easily by simply replacing one of the batteries with the RF control unit of the invention.

The above description of the invention is intended to be illustrative and not limiting. Various changes or modifications in the embodiments described may occur to those skilled in the art. These can be made without departing from the spirit or scope of the invention.

What is claimed is:

1. In or for a wireless control device including a first housing,
   a radiation emitter mounted to said first housing, said emitter being selected from the group consisting of infrared and ultrasonic emitters for remotely controlling an electronic system,
   a RF control device comprising
   a RF transceiver,
   a second housing, said RF transceiver being mounted to said second housing,
   said transceiver having at least one terminal for connection to a power line in said wireless control device for use with said power line as an antenna for said transceiver, said electronic system being selected from the group consisting of television receivers, VCR devices, MP3 devices, DVD devices, personal computers, and printers, and
   a switching device for selectively disabling and enabling said RF control device,
   said first and second housings having mating electrical connector structures for connection of said one transceiver terminal to said power line.

2. A device as in claim 1 in which said RF control device includes transmitter circuitry and receiving circuitry connected to said terminal for transmitting and receiving RF signals using said power line as an antenna.

3. A device as in claim 2 including a detector circuit connected to said terminal and said transmitter circuitry for detecting data signals from said power line and delivering corresponding signals to said transmitter circuitry for transmission.

4. A device as in claim 1 in which said power line comprises a conductor on a printed circuit board.

5. A device as in claim 4 in which said printed circuit board has an outer periphery and said conductor extends around substantially all of said outer periphery.

6. A device as in claim 1, said transceiver including a detector for detecting communications data from said power line, and means for converting said data into an RF format signal for transmission from said antenna.

7. A device as in claim 1 in which said switching device includes an on/off switch with means for introducing a unique identifying signal into said transceiver to ensure recognition only of RF signals having this identifying signal to prevent mis-operation of the wireless control device.

8. A device as in claim 7 in which said switch extends outside of and is operable by the user to enable or disable the RF function of said device.

9. In or for a wireless control device for remotely controlling an electronic system, a RF control device comprising
   a RF transceiver,
   said transceiver having at least one terminal for connection to a power line in said wireless control device for use with said power line as an antenna for said transceiver, and including a housing shaped like a battery to fit into the battery compartment of said wireless control device and having terminals for contacting terminals in said battery compartment which are connected to said power line.

10. A device as in claim 9 in which said housing is made of a material selected from the group consisting of conductive metal and other conductive material.

11. A device as in claim 9 including in said housing a battery which is selected from the group consisting of an easily replaceable single use battery and a rechargeable battery.

12. A device as in claim 11 including a primary battery usable with the first-named battery to power said wireless control device.

13. A device as in claim 9, said housing having an electrical contact for contacting a terminal of said wireless control device to receive an enable signal and communication signals from said wireless control device and thereby enable transmission of RF communication information by said transceiver.

14. A device as in claim 13 in which said electrical contact comprises a conductive ring extending from the surface of said housing, and said terminal of said wireless control device comprises an interrupt terminal.

15. In or for a wireless control device for remotely controlling an electronic system, a RF control device comprising
   a RF transceiver,
   said transceiver having at least one terminal for connection to a power line in said wireless control device for use with said power line as an antenna for said transceiver,
   said transceiver including a detector for detecting communications data from said power line, and means for converting said data into an RF format signal for transmission from said antenna, and in which said transceiver includes means for detecting an RF signal in said power line and creating a corresponding detection signal, and using said detection signal as an enable signal to enable RF signal transmission.

16. A device as in claim 15 in which said transceiver includes means for transmitting a unique signal for said transceiver to distinguish said transceiver from others and for identifying received signals which contain said unique signal and responding only to signals so identified.

17. A device as in claim 15 in which said transceiver includes an A/D converter for receiving signals from said antenna and converting them to digital form, a control circuit device for receiving signals from said A/D converter, converting them to RF format signals, and sending the resulting signals to a D/A converter to produce analog RF signals, amplifier means for amplifying said RF signals, said control circuit device being adapted to send enable signals to said amplifier means to enable transmission of signals corresponding to said RF signals.

18. A device as in claim 15 in which said transceiver includes a receiving amplifier coupled to said power line to receive incoming RF signals from said power line and a RF receiving filter connected to said A/D converter to cause said control circuit device to deliver received signals to said wireless control device.

19. A wireless control device having a signaling radiation emitter selected from the group consisting of infrared and ultrasonic emitters with control circuitry for converting manual input signals into control signals for said radiation emitter, and a power line for supplying electrical power to said control circuitry, a RF control device including a RF transmitter connected to said power line for use of said power line as an antenna for said transmitter, connecting means for coupling said control signals to said transmitter whereby said transmitter can transmit corresponding RF signals by way of said antenna, and a switching device for selectively disabling and enabling said RF control device, further comprising a RF receiver for use at a location remote from said control device to control a controlled device in accordance with RF signals received by said receiver from said transmitter, said wireless control device having a housing with a battery compartment, said RF control device having a housing shaped and sized to fit into said compartment in place of a battery, and housing terminals to connect said power line to said control device.

20. A device as in claim 19 in which said power line is a conductive path around the outer periphery of a printed circuit board in said control device.

21. A device as in claim 19 said RF control device including a detector for detecting communication signals from said power line and transmitting corresponding RF signals.

\* \* \* \* \*